US006662919B2

(12) United States Patent
Jung et al.

(10) Patent No.: US 6,662,919 B2
(45) Date of Patent: Dec. 16, 2003

(54) METHOD OF AND APPARATUS FOR THE APPLICATION OF ELECTRIC CURRENT TO COMPONENTS OF CLUTCH ACTUATING ASSEMBLIES

(75) Inventors: Mario Jung, Sinzheim (DE); Alexander Renfer, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/374,460

(22) Filed: Feb. 26, 2003

(65) Prior Publication Data
US 2003/0136627 A1 Jul. 24, 2003

Related U.S. Application Data

(63) Continuation of application No. PCT/DE01/03048, filed on Aug. 7, 2001.

(30) Foreign Application Priority Data

Aug. 31, 2000 (DE) .......................... 100 42 747

(51) Int. Cl.[7] ............................... F16D 48/06
(52) U.S. Cl. ................ 192/3.56; 192/3.58; 192/84.6; 192/90; 192/91 R
(58) Field of Search ................ 192/3.56, 3.63, 192/20, 84.1, 84.6, 90, 91 R, 3.58; 318/9, 15, 474

(56) References Cited

U.S. PATENT DOCUMENTS

| 3,581,156 | A | * | 5/1971 | Dolbachian et al. ....... 192/3.51 |
| 5,409,091 | A | | 4/1995 | Reik et al. |
| 5,450,934 | A | | 9/1995 | Maucher |
| 5,634,541 | A | | 6/1997 | Maucher |
| 5,679,091 | A | | 10/1997 | Salecker et al. |
| 6,000,515 | A | | 12/1999 | Kimmig et al. |
| 6,377,005 | B1 | * | 4/2002 | Zintler et al. .................. 318/9 |

* cited by examiner

Primary Examiner—Rodney H Bonck
(74) Attorney, Agent, or Firm—Darby & Darby

(57) ABSTRACT

The engageable and disengageable friction clutch between the prime mover and the gearbox in the power train of a motor vehicle can be adjusted by an electric motor against the opposition of at least one resilient element by applying rest current from a source to an electric motor which opposes the bias of the resilient element in response to detection, by a sensor, that the bias of such resilient element upon a displaceable clutch actuating member exceeds the force then being exerted by the clutch. The application of rest current to the motor normally takes place when the vehicle is started and/or subsequent to shifting of the gearbox into a different gear. The thus actuated motor can prevent a worm wheel gearing or an analogous motor-operated component from partially disengaging the clutch when the disengagement is undesirable or harmful.

19 Claims, 4 Drawing Sheets

METHOD OF AND APPARATUS FOR THE APPLICATION OF ELECTRIC CURRENT TO COMPONENTS OF CLUTCH ACTUATING ASSEMBLIES

CROSS-REFERENCE TO RELATED CASES

This is a continuation of international application Serial No. PCT/DE01/03048, filed Aug. 7, 2001, the entire disclosure of which is hereby incorporated by reference and claim the priority of German patent application Serial No. 100 427 47.2-51 (filed Aug. 31, 2000). The disclosures of the above-referenced priority applications, as well as that of each US and/or foreign patent and/or patent application identified in the specification of the present application, are incorporated herein by reference.

BACKGROUND OF THE INVENTION

The present invention relates to clutches in general, and more particularly to improvements in methods of and in apparatus for engaging and disengaging clutches, especially friction clutches in the power trains of motor vehicles. Still more particularly, the invention relates to improvements in methods of and in apparatus for regulating the supplying of electric current to current-consuming component parts of clutch actuating means.

The arrangement which serves to engage and disengage the friction clutch in the power train of a motor vehicle often comprises current-consuming parts (e.g., parts including an electric motor) which initiate the engagement, or a change of the extent of engagement, of the clutch between the prime mover (such as an internal combustion engine) and the change-speed transmission in the power train of the vehicle. It is often necessary to supply to such current-consuming parts a certain amount of electric current (called rest current or remaining or remanent current) which amounts to a small fraction of maximum current (e.g., about 7 percent of maximum current) and the purpose of which is to avoid a resetting of the clutch actuating assembly or arrangement while the clutch is engaged. A reason for the tendency of the clutch actuating assembly to cause a resetting of the clutch is that, in many instances, such assembly employs a component part (e.g., a worm wheel gearing) which is actuatable by an electric motor and which is not entirely self-locking, i.e., it tends to effect an undesirable resetting of the clutch, e.g., at a time and under circumstances when a resetting is not only undesirable but can be dangerous to the occupant(s) of the motor vehicle. The purpose of the supplying of rest current to the current-consuming component(s) of the clutch actuating assembly is to prevent uncontrolled changes in the setting of the parts (such as the aforementioned worm wheel gearing) which are actuatable by the current-consuming components but exhibit a tendency to reset the clutch in the absence of an opposition from the current-consuming parts.

OBJECTS OF THE INVENTION

An object of the instant invention is to provide a novel and improved apparatus for regulating the supplying of rest current to one or more current-consuming parts which, when supplied with current, can oppose undesirable changes in the condition of clutch actuating means.

Another object of this invention is to provide a novel and improved method of regulating the supplying of electric current to one or more constituents of a clutch actuating assembly in the power train of a motor vehicle or the like.

A further object of the invention is to provide a power train which embodies a friction clutch and a rest current regulating apparatus of the above outlined character.

An additional object of the present invention is to provide a novel and improved method of preventing undesirable changes in the condition (extent of engagement) of a friction clutch in the power train of a motor vehicle.

Still another object of the invention is to provide a power train wherein an adjustable clutch can regulate the transmission of torque between a prime mover and a gearbox and wherein the setting of the clutch is less likely to change at an inopportune time than in presently known power trains.

A further object of the invention is to provide a novel and improved method of regulating the supplying of so-called rest current to an electric motor in a clutch actuating mechanism.

Another object of the invention is to provide a method which renders it possible to prevent uncontrolled or unsatisfactory or undesirable changes in the extent, especially relatively small extent, of engagement or disengagement of a clutch in the power train of a motor vehicle.

SUMMARY OF THE INVENTION

One feature of the present invention resides in te provision of an apparatus for manipulating the aforediscussed rest current in an actuator for a force exerting clutch. The improved apparatus comprises a source (e.g., at least one battery) of rest current, at least one consumer of rest current (e.g., an electric motor), at least one resilient element (e.g., a coil spring) which is arranged to act upon the actuator in a sense to oppose the force being exerted by the clutch, and means for effecting the application of rest current to the at least one consumer when the bias of the at least one resilient element upon the actuator exceeds the force being exerted by the clutch.

The means for effecting the application of rest current can include at least one sensor which is arranged to monitor at least one of a plurality of parameters including (a) the bias of the at least one resilient element and (b) the force being exerted by the clutch.

The actuator can include a worm wheel gearing which is interposed between the at least one consumer of rest current and the at least one resilient element.

The clutch can be arranged to transmit torque between a prime mover (such as an internal combustion engine) and a gearbox (also called change-speed transmission) in the at least partly engaged condition of the gearbox and includes a member (e.g., a lever) which is pivotable in a first direction by the at least one resilient element and in a second direction (such as counter to the first direction) by the at least one consumer of rest current. The relationship between the bias of the at least one resilient element upon the actuator and the extent of pivoting of the aforementioned member of the clutch is or can be a linear relationship.

Another feature of our invention resides in the provision of a method of situation-dependent regulation of rest current in an actuator for a force-applying clutch. The method comprises the steps of activating the application of rest current to thus assist the retention of the actuator in a sense to disengage the clutch, monitoring the bias of at least one resilient element (such as the aforementioned coil spring) acting upon the actuator, and switching off the rest current when the bias of the at least one resilient element upon the actuator exceeds the force being applied by the clutch.

The arrangement is or can be such that the activating step is carried out only during (a) starting of a motor vehicle having a power train which embodies the clutch, and (b) during shifting of a gearbox forming part of the power train.

The step of switching off the rest current can be carried out abruptly when the bias of the at least one resilient element exceeds the force being applied by the actuator upon a mobile member (such as the aforementioned lever) of the clutch against the opposition of the at least one resilient element.

The activating step can include abrupt application of rest current when the bias being applied by the at least one resilient element exceeds by a first threshold value that force which is being applied to the actuator by the clutch, and abrupt interruption of application of rest current when the bias of the at least one resilient element thereupon decreases to a second threshold value. The arrangement can be such that the first threshold value is reached when the bias of the at least one resilient element exceeds the force which the actuator applies to the at least one resilient element.

The activating step can be carried out by resorting to a ramp, a parabola, an exponential function, a polynomial of $n^{th}$ order or the like.

The step of switching off the rest current can be carried out abruptly in a sense to engage the clutch, and such step can include reversing the direction of current flow.

It is also within the purview of the present invention to abruptly carry out the activating step as well as the switching off step, and the switching off step can be followed by a step of reversing the direction of current flow to thus engage the clutch. The reversing step is or can be carried out after a mobile member (such as the aforementioned lever) of the actuator completes the travel through a predetermined distance.

The activating step can be carried out by way of a ramp, and the step of switching off the rest current can be carried out by way of a ramp in a sense to engage the clutch by reversing the direction of current flow.

The novel features which are considered as characteristic of the invention are set forth in particular in the appended claim. The improved apparatus itself, however, both as to its construction and the modes of assembling, installing and operating the same, together with numerous additional important and advantageous features and attributes thereof, wil be best understood upon perusal of the following detailed description of certain presently preferred specific embodiments with reference to the accompanying drawing.

DESCRIPTION OF PREFERRED EMBODIMENTS

Figure 1:
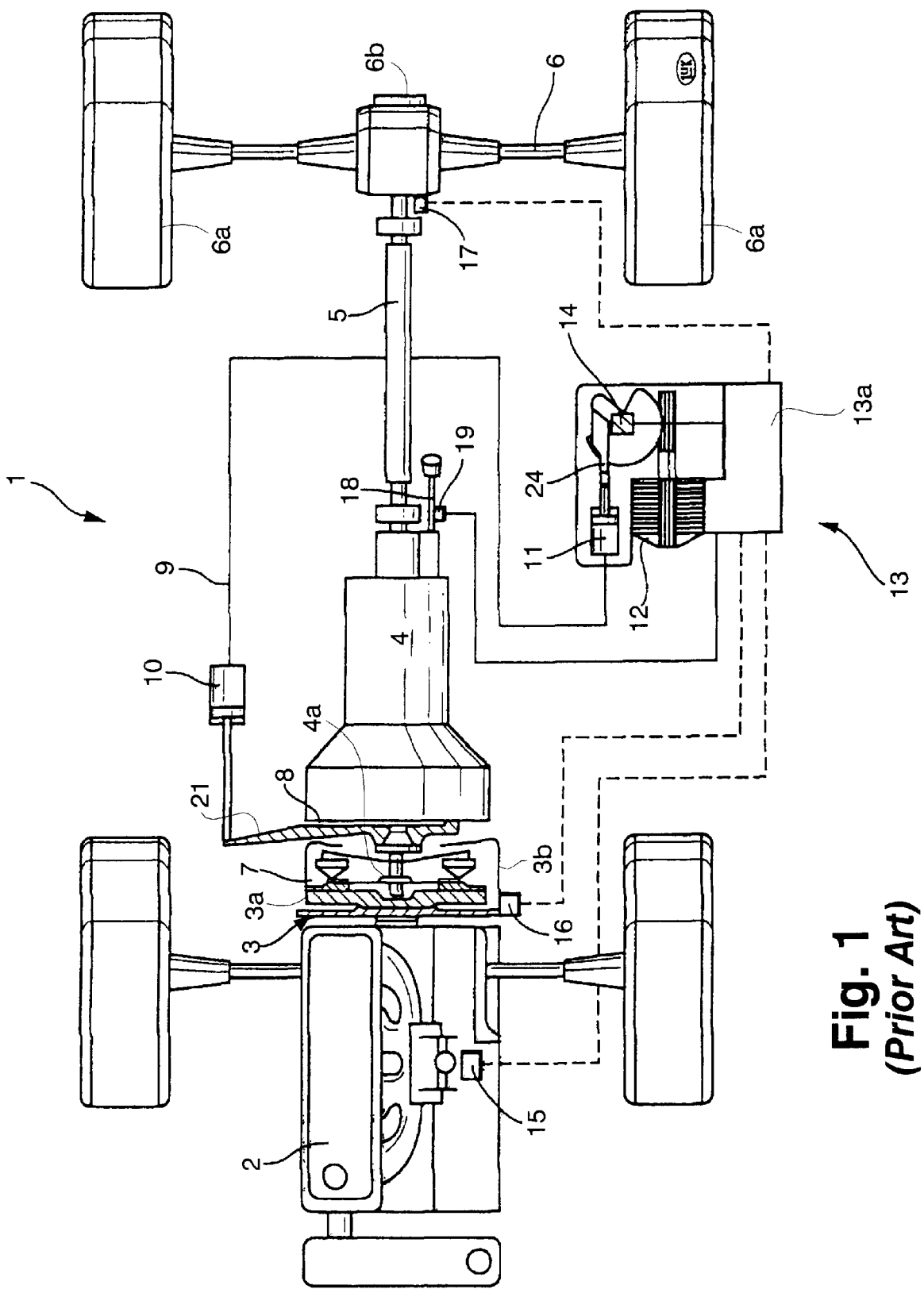
FIG. 1 is a schematic partially plan and partially sectional view of a power train which is installed in a motor vehicle and utilizes a presently known apparatus for the regulation of rest current.

FIG. 1 illustrates certain details of a known motor vehicle 1 having a prime mover 2 (e.g., an internal combustion engine) which has a rotary output element (such as a camshaft or a crankshaft, not shown) arranged to transmit torque to a rotary input element of a manually or automatically shiftable transmission or gearbox 4 by way of an automatic wear-compensating friction clutch 3. For example, the clutch 3 can be of the type disclosed in commonly owned U.S. Pat. No. 5,450,934 granted Sep. 19, 1995 to Maucher for "FRICTION CLUTCH".

Figure 2:
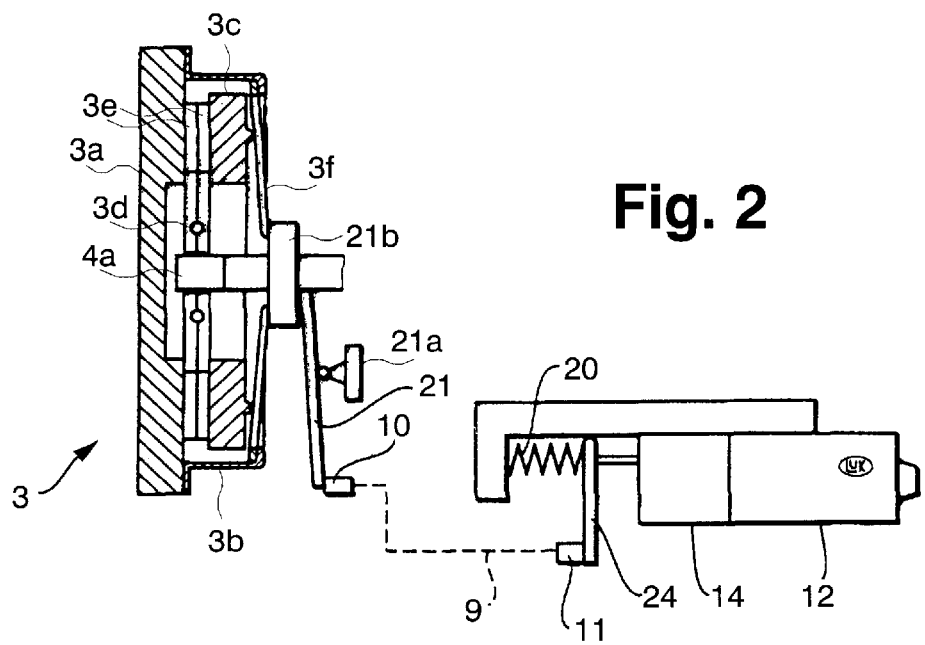
FIG. 2 is an enlarged axial sectional view of a friction clutch which forms part of the power train but cooperates with an apparatus embodying one form of the present invention.

As best shown in FIG. 2, the clutch 3 can comprise a rotary counterpressure plate 3a which is driven by the output element of the prime mover 2, a housing or cover 3b which rotates with the counterpressure plate 3a, a pressure plate 3c which rotates with the counterpressure pressure plate 3a and is movable in the housing 3b axially toward and away from the counterpressure plate, a clutch disc or clutch plate 3d which is mounted on and rotates with the input shaft 4a of the gearbox 4, two friction linings 3e borne by the clutch disc 3d and arranged to receive torque from the plates 3a, 3c when the clutch 3 is at least partially engaged, a diaphragm spring 3f which biases the pressure plate 3c against the adjacent friction lining 3e (to thus bias the other fricton lining 3e against the counterpressure plate 3a), and a mobile member 21 here shown as a pivotable clutch engaging/disengaging lever which is fulcrumed at 21a and can cause or permit the diaphragm spring 3f to change its conicity in order to at least partially engage or disengage the clutch 3.

Referring again to FIG. 1, the output shaft 5 of the gearbox 4 can drive an axle 6 for the respective pair of vehicle wheels 6a by way of a differential 6b.

The counterpressure plate 3a forms part of the input side 7 of the clutch 3 (i.e., of that side which can receive torque from the prime mover 2), and the clutch 3 further includes an output side 8 at the gearbox 4.

The means for automatically operating the clutch 3 comprises a control unit 13 embodying a hydraulic slave cylinder 10 and a hydraulic master cylinder 11 connected with the cylinder 10 by a hydraulic conduit 9. Such operating means further comprises an electric motor 12 which is connected with the piston rod 24 of the mastery cylinder 11 and is controlled by an electronic circuit 13a of the control unit 13. FIG. 1 merely shows the housing of the electronic circuit 13a.

The control unit 13 receives signals from several sensors including a first sensor 15 which is mounted directly on the prime mover 2 and, in the illustrated embodiment, directly monitors the position of the throttle valve, an engine RPM sensor 16, and a tachometer sensor 17 at the axle 6. FIG. 1 further shows a lever 18 which can shift the gearbox 4 into a selected gear (such as neutral, reverse or one of several forward gears) and cooperates with a sensor 19 serving to transmit to the control unit 13 signals denoting the positions of the lever 18, i.e., the selected gear of the part 4.

The control unit 13 is set up to transmit to the electric motor 12 a signal denoting a parameter which is a function of the signals from the aforementioned sensor 15, 16, 17 and/or 19. To this end, the circuit 13a stores a program in the form of hardware or software. The electric motor 12 acts upon the lever 21 of the clutch 3 (in response to signals from the control unit 13) by way of the master cylinder 11, conduit 9 and slave cylinder 10. In addition to or in lieu of the aforementioned U.S. Pat. No. 5,450,934 to Maucher, reference (regarding the mode of operation of the clutch 3) may also be had to German patents Nos. 42 39 291 A, 43 06 505 A, 42 39 289 A, 43 22 677 A and 195 04 847 A1 (FIG. 10 off the latter shows, for example, a power train similar to that shown in the aforedescribed FIG. 1).

In order to assist the self-holding of the control unit 13 at elevated disengaging forces, it is provided that, under certain circumstances, remanent or rest current (hereinafter called rest current) supplied to the electrical part(s) of the clutch actuator 13 be activated subsequent to turning off of the position regulator. However, the problem which arises under such circumstances is that, when the extent of disengagement is small (i.e., when the force of the resilient element (compensating spring) 20 shown in and to be described with reference to FIG. 2 is greater than the load), the automatic regulation behavior deteriorates and the control unit can even (unintentionally) proceed in a forward direction.

The apparatus and the method of the present invention prevent a reduction of the quality of the automatic regulation behavior of the clutch 3, especially if the extent of clutch disengagement is small or relatively small. This is accomplished in that, for automatic retention of the lever 21, there is activated (turned on) a rest current for the electric motor 12 to be thereupon turned off when the force of the compensating spring (20) which acts upon the piston rod 24 exceeds the force which is being exerted by the clutch 3.

An important advantage of the apparatus and of the method of the present invention is that one can avoid the problems which develop in connection with the switching on of the rest current for the purpose of assisting automatic retention of the control unit 13 at elevated disengaging forces in that the rest current is switched off in dependency upon the prevailing circumstances. Especially when the extent of disengagement of the clutch 3 is small and if the bias of the resilient element 20 exceeds the load, one can improve the regulation of the clutch operation and it is even possible to avoid or prevent unintentional forward shifting of the control unit 13.

FIG. 2 illustrates certain details of the power train which is shown in FIG. 1 and a rest current manipulating apparatus which embodies one form of the present invention. The mobile member or lever 21 is fulcrumed at 21a and can displace a bearing 21b which, in turn, can pivot the radially inwardly extending prongs of the diaphragm spring 3f of the clutch 3 to thus change the conicity of this spring. The lever 21 is pivotable by the slave cylinder 10 and by the master cylinder 11 which latter includes the aforementioned piston rod 24 receiving (when necessary) motion from the electric motor 12 through the medium of a self-locking device (such as a worm wheel gearing) 14 against the opposition of the resilient element (compensating spring) 20. The clutch 3 must be disengaged against the opposition of the compensating spring 20 (e.g., a single coil spring or a composite resilient element).

Figure 3:
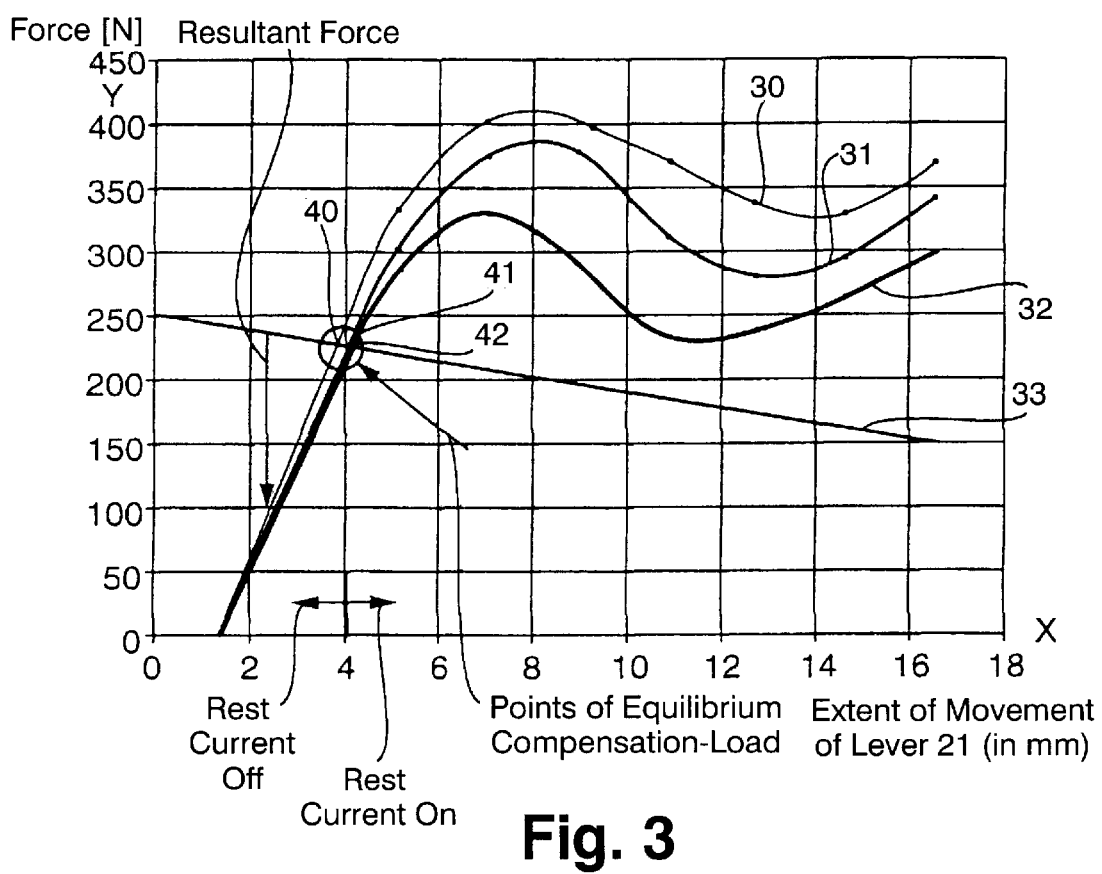
FIG. 3 shows a coordinate system wherein three of the curves denote relationships between the clutch engaging/disengaging members and the forces being applied at the levers, and a fourth curve denotes the relationship between the force of the compensating spring and the extent of pivoting of the member of the clutch actuating assembly shown in FIG. 2.

FIG. 3 shows a coordinate system wherein the extent of movement of the pivotable clutch engaging/disengaging lever 21 is measured along the abscissa (X) and the magnitude of the clutch force (in Newtons) which develops in response to displacement of the lever 21 is measured along the ordinate (Y). The curves 30, 31 and 32 denote the changes of forces in three different friction clutches, i.e., the relationships between the extents of movement of three different levers 21 and the resulting forces. The fourth curve 33 is representative of the relationship between the magnitude of the force being generated by the compensating coil spring 20 and the extent of movement of the pivotable lever 21. The illustrated curve 33 is a more or less straight line which is inclined with reference to the X-axis of the coordinate system shown in FIG. 3; this curve shows that the force being represented thereby decreases in response to increasing distance covered by (i.e., pivoting of) the lever 21.

In order to overcome or avoid the aforediscussed problems which arise in connection with the application of rest current to the clutch setting device including the electric motor 12 and the lever 14 at elevated disengaging forces, it is proposed in accordance with the present invention to terminate the application of rest current as a function of the prevailing conditions and of the distance covered (i.e., the extent of movement carried out) by the lever 21. FIG. 3 shows that there exists for each clutch 3 (of which only one is actually shown) a discrete equilibrium point 40, 41, 42, respectively, namely between the force of the lever 21 and the force of the compensating spring 20. The invention provides that the rest current be turned off at that time or instant or moment when the force of the lever 21 is smaller than the bias of the compensating spring 20. This renders it possible to avoid the danger of pushing the clutch disc out of its position under the bias of the compensating spring 20.

It is also conceivable that, if the lever 21 moves forwardly without it being provided for by the position regulating means, the rest current be switched off or the lever 21 be actuated in dependency upon the position in the direction "clutch engaging". This suppresses or reduces the extent of an uncontrolled advancement of the lever 21 in a forward direction.

Figure 4:
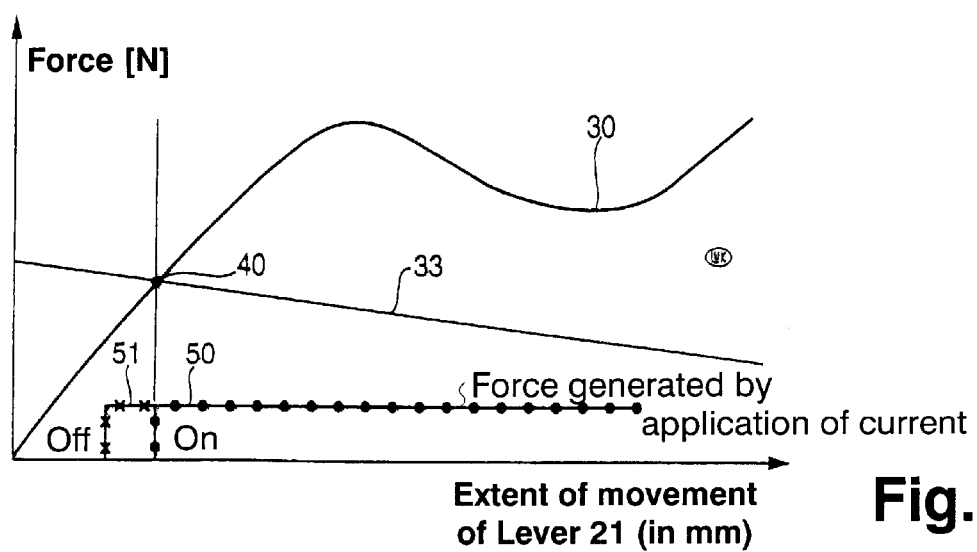
FIGS. 4 to 8 illustrate various diagrams pertaining to turning off of the rest current.

FIGS. 4 to 8 illustrate additional possibilities of switching off the rest current in accordance with several modifications of the method and apparatus described hereinbefore with reference to FIGS. 2 and 3. Referring first to FIG. 4, there is shown a coordinate system wherein the extent of movement (in millimeters) of the lever 21 is measured along the abscissa and the force (in Newtons) exerted in response to movement (pivoting) of such lever is measured along the ordinate. The rest current is switched on when the lever moves beyond (above) a first threshold or limit position 50, and such current is switched off when the lever 21 moves beyond (below) a second threshold or limit position 51. Thus, the value 51 is smaller than the value 50. The arrangement is preferably such that the threshold value corresponds to the position of the lever 21 at the intersection 40 of the curves 30 and 33.

When the direction of rotation of the output element of the electric motor 12 is reversed, the rest current can be switched on at the threshold value 51, and such rest current is switched off when the threshold value is at 50. The threshold value 51 is then greater than 50. This means that, during disengagement of the clutch 3, the rest current is already switched on at a small or low value whereas, during engagement of the clutch, the rest current is switched off already at a higher position.

In order to avoid pronounced thermal stressing of the control unit 13, the rest current should preferably be active (under all conceivable circumstances) only at such times when the clutch torque must accurately match a required value, namely or preferably at starting of the vehicle or subsequent to shifting (at 18) of the gearbox 4 into a different gear.

Figure 5:
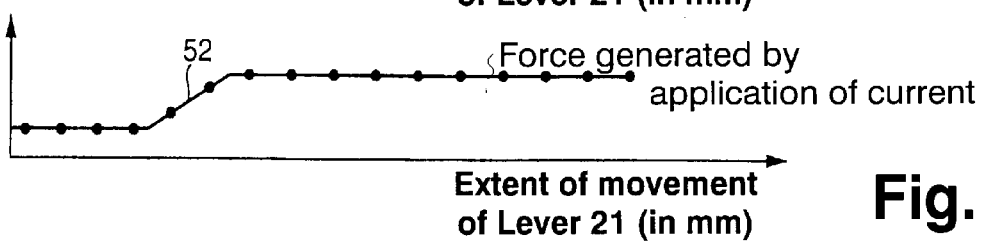

Referring to FIG. 5, the switching on of the rest current need not take place abruptly or suddenly. Instead, the switching on of such current takes place gradually by way of a ramp 52 and no switching on takes place below the point 40 of equilibrium.

Figure 6:
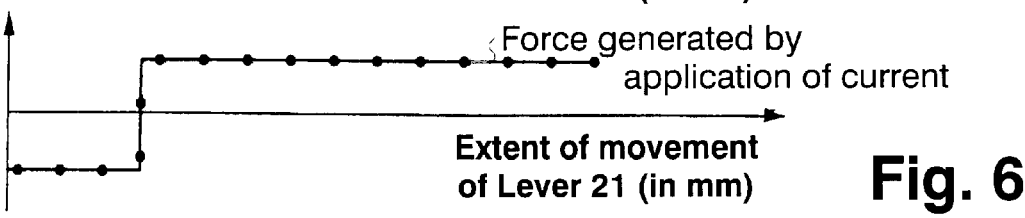

FIG. 6 shows that the switching on or off of the rest current can take place abruptly below the equilibrium point 40 in such a way that the rest current is switched on below the point 40.

Figure 7:
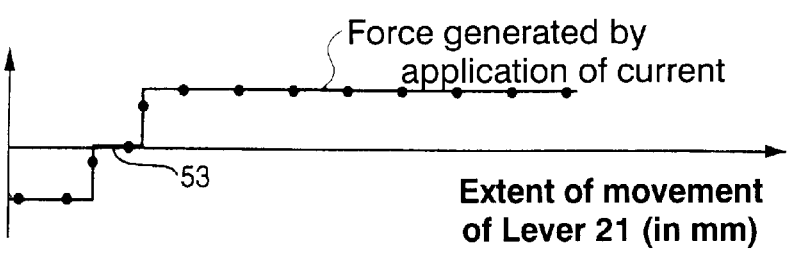

Referring to FIG. 7, the rest current can be abruptly switched on or off at the equilibrium point 40 in such a way that the switching off is followed by abrupt switching in the opposite direction (i.e., to engage the clutch 3) as soon as the lever 21 has covered a predetermined distance 53 in the direction of the X-axis.

Figure 8:
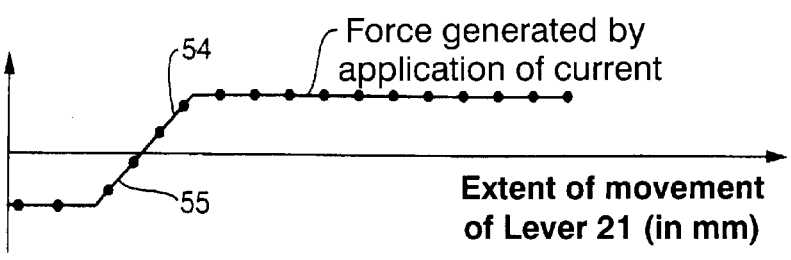

FIG. 8 shows that the switching on of the rest current takes place by way of a ramp 54 starting at the point of intersection 40 (see also FIGS. 3 and 4) whereas the switching on in the opposite direction (from the point 40) takes place by way of another ramp 55.

The control unit 13 comprises a source of rest current (such as a battery) which is or which can be installed in the housing for the circuit 13a. Such housing can further confine the arrangement which regulates the flow of rest current to the electric motor 12 so that the latter prevents uncontrolled changes of the condition of the worm wheel gearing 14 in the power flow between the motor 12 and the master cylinder 11. This is shown in FIGS. 1 and 2. As used herein, the term "rest current" can be associated with reversal of polarity when the rest current is to be turned off to thus more rapidly interrupt the eventually initiated movement of the lever 21 in a direction away from the desired or required position.

Figure 9:
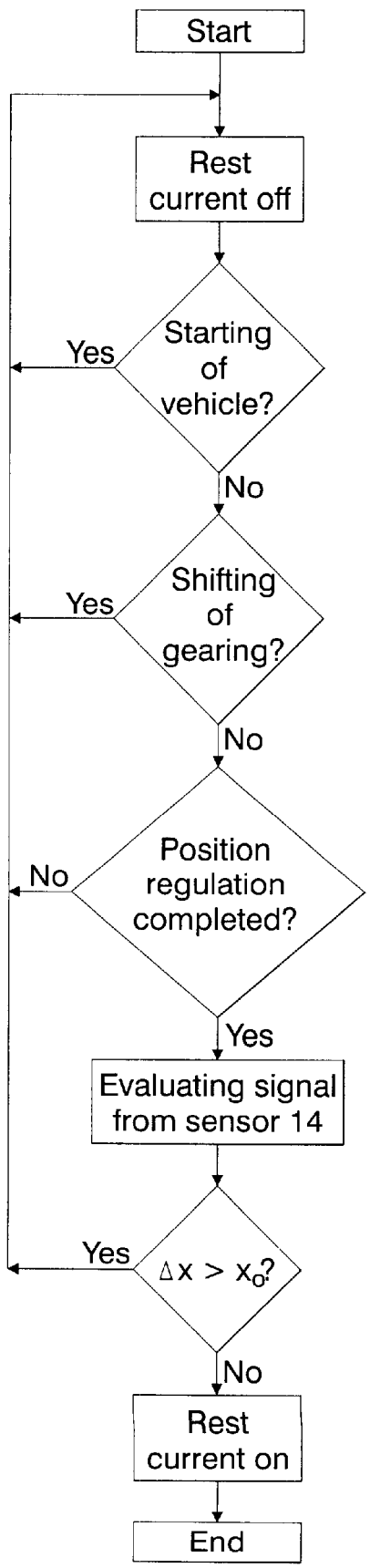
FIG. 9 is a flow chart illustrating various circumstances of turning on and off the rest current.

The flow chart of FIG. 9 illustrates the various steps of the improved method. Thus, at the start, the rest current is turned off. The various inquiries as to whether or not the motor vehicle 1 is being started and/or the gearbox 4 is being shifted into a different gear are regulated in such a way that, in the event of existence of one of such conditions, the rest current is switched off or remains turned on. The next step involves the ascertainment as to whether or not the position regulation is completed; in the absence of such completion, the application of rest current is interrupted. On the other hand, if the application is completed, the signal which is being transmitted by the sensor 14 is processed as soon as the sensor transmits a signal $\Delta x$ departing from a threshold value $x_O$ and the rest current is turned off or remains applied to the motor 12. If the sensor signal remains below the threshold value $x_O$, the rest current is applied. Such routine can run in the background continuously in the form of a loop.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of regulating the supplying of rest current to clutch actuating means and, therefore, such adaptations should and are intended to be comprehended within the meaning and range of equivalence of the appended claims.

What is claimed is:

1. Apparatus for manipulating rest current in an actuator for a force exerting clutch, comprising:
   a source of rest current;
   at least one consumer of rest current;
   at least one resilient element arranged to act upon the actuator in a sense to oppose the force being exerted by the clutch; and
   means for effecting the application of rest current to said at least one consumer when the bias of the at least one resilient element upon the actuator exceeds the force being exerted by the clutch.

2. The apparatus of claim 1, wherein said at least one consumer includes an electric motor.

3. The apparatus of claim 1, wherein said source of rest current includes a battery.

4. The apparatus of claim 1, wherein said means for effecting the application of rest current includes a sensor arranged to monitor at least one of (a) the bias of said at least one resilient element and (b) the force being exerted by the clutch.

5. The apparatus of claim 1, wherein the actuator includes a worm wheel gearing interposed between said at least one consumer and said at least one resilient element.

6. The apparatus of claim 1, wherein the clutch is arranged to transmit torque between a prime mover and a gearbox in the at least partly engaged condition thereof and includes a member pivotable in a first direction by said at least one resilient element and in a second direction by said at least one consumer of rest current.

7. The apparatus of claim 6, wherein the relationship between the bias of said at least one resilient element upon the actuator and the extent of pivoting of said member of the clutch is a linear relationship.

8. A method of situation-dependent regulation of rest current in an actuator for a force-applying clutch, comprising the steps of:
   activating the application of rest current to thus assist the retention of the actuator in a sense to disengage the clutch;
   monitoring the bias of at least one resilient element acting upon the actuator; and
   switching off the rest current when the bias of the at least one resilient element upon the actuator exceeds the force being applied by the clutch.

9. The method of claim 8, wherein said activating step is carried out only during (a) starting of a motor vehicle having a power train which embodies the clutch, and (b) during shifting of a gearbox forming part of the power train.

10. The method of claim 8, wherein said step of switching off the rest current is carried out abruptly when the bias of the at least one resilient element exceeds the force being applied by the actuator upon a mobile member of the clutch against the opposition of the at least one resilient element.

11. The method of claim 8, wherein said activating step includes abrupt application of rest current when the bias being applied by the at least one resilient element exceeds by a first threshold value that force which is being applied to the actuator by the clutch, and abrupt interruption of application of rest current when the bias of the at least one resilient element thereupon decreases to a second threshold value.

12. The method of claim 11, wherein said first threshold value is reached when the bias of the at least one resilient element exceeds the force which the actuator applies to the at least one resilient element.

13. The method of claim 8, wherein said activating step is carried out by resorting to at least one of a ramp, a parabola, an exponential function and a polynomial of $n^{th}$ order.

14. The method of claim 8, wherein said step of switching off the rest current is carried out abruptly in a sense to engage the clutch.

15. The method of claim 14, wherein said step of switching off includes reversing the direction of current flow.

16. The method of claim 8, wherein each of said activating and switching off steps is carried out abruptly and said switching off step is followed by a step of reversing the direction of current flow to thus engage the clutch.

17. The method of claim 16, wherein said reversing step is carried out after a mobile member of the actuator covers a predetermined distance.

18. The method of claim 8, wherein said activating step is carried out by way of a ramp.

19. The method of claim 8, wherein said step of switching off the rest current is carried out by way of a ramp in a sense to engage the clutch by reversing the direction of current flow.

\* \* \* \* \*